United States Patent
Espinasse

(10) Patent No.: US 6,843,278 B2
(45) Date of Patent: Jan. 18, 2005

(54) FLEXIBLE DUCT WITH SHRINKAGE-PROOF FILM

(75) Inventor: Philippe François Espinasse, Bihorel (FR)

(73) Assignee: Technip France (FR)

( * ) Notice: Subject to any disclaimer, the term of this patent is extended or adjusted under 35 U.S.C. 154(b) by 0 days.

(21) Appl. No.: 10/468,088

(22) PCT Filed: Feb. 18, 2002

(86) PCT No.: PCT/FR02/00613
§ 371 (c)(1),
(2), (4) Date: Aug. 13, 2003

(87) PCT Pub. No.: WO02/066878
PCT Pub. Date: Aug. 29, 2002

(65) Prior Publication Data
US 2004/0060610 A1 Apr. 1, 2004

(30) Foreign Application Priority Data
Feb. 22, 2001 (FR) .......................... 01 02403

(51) Int. Cl.⁷ .............................. F16L 11/12
(52) U.S. Cl. ............... 138/134; 138/131; 138/135; 138/127; 138/139
(58) Field of Search ............. 138/131, 134, 138/135, 127, 137, 139, 129, 130, 172, 177

(56) References Cited

U.S. PATENT DOCUMENTS

| | | | | |
|---|---|---|---|---|
| 1,954,724 A | * | 4/1934 | Collom | 138/132 |
| 4,417,603 A | * | 11/1983 | Argy | 138/149 |
| 4,706,713 A | * | 11/1987 | Sadamitsu et al. | 138/137 |
| 4,867,205 A | * | 9/1989 | Bournazel et al. | 138/130 |
| 5,176,179 A | * | 1/1993 | Bournazel et al. | 138/130 |
| 5,275,209 A | * | 1/1994 | Sugier et al. | 138/135 |
| 5,406,984 A | * | 4/1995 | Sugier et al. | 138/135 |
| 5,601,893 A | * | 2/1997 | Strassel et al. | 428/35.9 |
| 5,669,420 A | * | 9/1997 | Herrero et al. | 138/135 |
| 5,918,641 A | * | 7/1999 | Hardy et al. | 138/132 |
| 5,934,335 A | * | 8/1999 | Hardy | 138/131 |
| 6,016,847 A | * | 1/2000 | Jung et al. | 138/131 |
| 6,039,083 A | * | 3/2000 | Loper | 138/135 |
| 6,085,799 A | * | 7/2000 | Kodaissi et al. | 138/135 |
| 6,110,550 A | * | 8/2000 | Jarrin et al. | 428/36.91 |
| 6,123,114 A | * | 9/2000 | Seguin et al. | 138/124 |
| 6,145,546 A | * | 11/2000 | Hardy et al. | 138/136 |
| 6,401,760 B2 | * | 6/2002 | Espinasse | 138/135 |
| 6,408,891 B1 | * | 6/2002 | Jung et al. | 138/127 |
| 6,415,825 B1 | * | 7/2002 | Dupoiron et al. | 138/127 |
| 6,668,866 B2 | * | 12/2003 | Glejbol et al. | 138/134 |
| 6,691,743 B2 | * | 2/2004 | Espinasse | 138/134 |
| 6,739,355 B2 | * | 5/2004 | Glejbøl et al. | 138/135 |

FOREIGN PATENT DOCUMENTS

| | | | |
|---|---|---|---|
| EP | 0166385 | 1/1986 | |
| EP | 485220 A1 | * 5/1992 | .......... F16L/11/127 |
| EP | 0749546 | 12/1996 | |
| FR | 2732441 | 10/1996 | |
| FR | 2752904 | 3/1998 | |
| FR | 2779797 | 12/1999 | |
| FR | 2784445 | 4/2000 | |

* cited by examiner

Primary Examiner—Patrick Brinson
(74) Attorney, Agent, or Firm—Ostrolenk, Faber, Gerb & Soffen, LLP

(57) ABSTRACT

The invention concerns a flexible duct (1) comprising from inside outwards a carcass (2) produced by a short-pitched metallic helical winding forming butt gaps (12), an overlapping layer (10) acting as a heat shield consisting of helically wound plastic strips (10a, 10b), a sealed inner pressure sheath (3), extruded in plastic on said overlapping layer (10), at least an armouring web (5) and at least an outer sealing sheath (7). The invention is characterised in that the overlapping strips (10a, 10b) are wound at a winding angle less than 35°.

16 Claims, 3 Drawing Sheets

FLEXIBLE DUCT WITH SHRINKAGE-PROOF FILM

BACKGROUND OF THE INVENTION

The present invention relates to a flexible pipe that can be used for transporting fluids, such as hydrocarbons for example.

Several types of flexible pipe are used. Some flexible pipes comprise, from the inside outward, an internal sealing sheath made of a plastic, an elastomer or another relatively flexible suitable material; an unsealed flexible metal tube that has to withstand the forces developed by the pressure of the fluid flowing in the pipe; one or more armor plies and at least one external sealing sheath made of a polymeric material. This type of flexible pipe is often called a smooth-bore pipe by experts in the field.

Other flexible pipes, called rough-bore pipes, comprise, from the inside outward, an unsealed flexible metal tube, called a carcass, formed by a profile wound in turns and mutually interlocked, such as, for example, an interlocked strip or an interlocked shaped wire such as a T-shaped, U-shaped, S-shaped or zeta-shaped wire; an internal sealing sheath made of a polymeric material; one or more armor plies capable of withstanding the forces developed by the pressure of the fluid flowing in the pipe and the external forces to which the flexible pipe is subjected; and at least one external protected sheath of the polymeric type.

In the latter type of flexible pipe, the internal sealing sheath is extruded, continuously, directly over said carcass, which has interstices or gaps between the wound turns.

To ensure good contact between the internal sealing sheath and the metal carcass, it is necessary for the inside diameter of the internal sealing sheath to be as close as possible and even equal to the outside diameter of the flexible metal carcass.

During manufacture of a rough-bore flexible pipe, the internal sealing sheath, which is extruded over the metal carcass, contracts onto the latter during cooling. Depending on the materials used for producing the internal sealing sheath, after cooling deformations called "shrinkage cavities" are observed, these cavities appearing on the internal face of said internal sealing sheath and especially on either side of the gaps between the turns of the metal carcass. Such shrinkage cavities are due, it would seem, to the differential shrinkage of the material used for the internal sealing sheath, because of the variation in the cooling gradient through the thickness of the internal sealing sheath, combined with the effect of the gaps between the turns of the metal carcass. Since the extruded plastic sealing sheath is in contact by its internal face with the metal carcass, which is at room temperature, this results in said internal face cooling very rapidly, thereby causing surface irregularities or shrinkage cavities; this phenomenon is exacerbated at the gaps between the turns of the metal carcass, the differential shrinkage at these points causing local variations in the thickness of the internal sealing sheath. When the sealing sheath is made of a semicrystalline polymer sensitive to the presence of surface defects causing a weakening of the sheath, possibly to the point of failure, such as PVDF (polyvinylidine fluoride) for example, this very often leads, in operation, to degradation (failure) of said sealing sheath, which then no longer fulfils its sealing function.

To remedy such a drawback and to solve the problem posed by the appearance of shrinkage cavities, a first solution consisted in placing, between the metal carcass and the internal sealing sheath, a thin sacrificial underlayer (thickness about 2 to 3 mm) made of a suitable material such as PVDF, which then serves as a heat shield. The internal sealing sheath is extruded over said sacrificial underlayer, but without any assurance that there is intimate bonding or "welding" between the sealing sheath and the sacrificial underlayer, so that cracks, that can propagate from the internal face of the underlayer to the outside, are blocked at the sealing sheath/sacrificial underlayer interface.

The major drawback of this solution is the slip that is liable to occur between the internal sealing sheath and the sacrificial underlayer at the ends of the flexible pipe, and the additional raw material and conversion costs incurred by the presence of said sacrificial underlayer.

Provision could be made to extrude a thinner sacrificial sheath (thickness less than or equal to 1 mm), but, because of the diameter of the extruded tube (greater than 10 cm), it is impossible for so thin a tube to be extruded on an industrial scale. It is therefore limited to a 2 to 3 mm thick sheath. In addition, the operation requires the intermediate sheath to be wound on an intermediate reel and, since the intermediate sheath is thin, it will buckle during winding.

To avoid these drawbacks, document FR 2 752 904 (COFLEXIP) proposed a process for manufacturing flexible pipes that consists in heating the flexible metal tube or metal carcass to a temperature of below 100° C., upstream of the extrusion means, so as in this way to avoid suddenly cooling the internal face during extrusion over the metal carcass.

For plastics of very low viscosity, it is necessary to heat the product to a very high temperature, and consequently to heat the carcass to a high temperature. This high temperature induces very substantial thermal creep in the gaps of the carcass, requiring the insertion, into these gaps, of a rod that limits the volume of creep in order to prevent blockage of the carcass. Such a rod is described in document FR 2 779 797 (COFLEXIP), but the spiraling of the rod in the gaps of the carcass is not simple to implement. Documents EP 0 749 546 (COFLEXIP-ELF ATOCHEM) and FR 2 732 441 (COFLEXIP) disclose the short-pitch helical winding of an intermediate strip for following and partially filling the gaps, and are therefore similar to the previous solution.

Another solution, proposed in document EP 166 385 (FURUKAWA), consists in winding, around the carcass, several layers of thin plastic (for example polyester) tapes (thickness about 0.5 mm for a tube about 2 to 8 cm inside diameter). This interlayer masks the gaps and prevents the sealing sheath from creeping into the gaps in the carcass. The details of the winding are not explained in the document.

The interlayer, by preventing the sealing sheath from creeping into the carcass, consequently also prevents the sheath from bonding to the carcass and therefore creates problems of slip between the two layers. For riser applications, this may cause the flexible pipe to deteriorate: since the gap between the turns is not controlled by the creep indentations, the carcass can slip under its own weight, the gaps between turns being canceled out and accumulating at the base of the riser, causing destruction of the carcass in the upper part.

SUMMARY OF THE INVENTION

The objective of the invention is to propose, within the context of a flexible pipe, a carcass-covering system that serves as a heat shield for the extruded plastic sheath so as to prevent the formation of shrinkage cavities, but does not have the drawbacks of the aforementioned solutions and enables it to be put into place simply.

The invention achieves its objective by means of a flexible pipe of the type comprising, from the inside outward, a carcass formed by a short-pitch helical metal winding leaving gaps, a covering layer serving as a heat shield, consisting of helically wound plastic tapes, an internal sealed pressure sheath made of a plastic extruded over said covering layer, at least one armor ply wound around said sealing sheath and at least one external sealing sheath, characterized in that the covering tapes are wound with a long pitch, that is to say with a winding angle of less than 35°.

To do this, a taping unit is placed upstream of the sheath extruder in order to wind several thin plastic tapes around the carcass with a long pitch, preferably between 10° and 35°.

These tapes are preferably wound with an overlap, thereby making it possible to ensure that the entire carcass is covered with this layer. This overlapping of the tapes may create a defect on the internal surface of the extruded sheath, but this possible defect is a long-pitch helical defect, and therefore does not have a great influence on the sealing sheath. The overlap of the tapes is typically about 10% of the tape width.

By winding the tapes with a long pitch, the scrapers of the extruder are prevented from lifting these tapes up and the length of tapes needed for covering the entire length of the flexible pipe is thus limited, which avoids having to recharge the taping unit during production.

The tape is thick enough to serve as a heat shield for the sealing sheath during extrusion (until the internal surface of the sheath has solidified) in order to prevent the formation of shrinkage cavities, but thin enough, however, to allow indentation of the sealing sheath into the gaps in the carcass in order to allow bonding thereto. Advantageously, the indentations form approximately 20% to 75% of the volume of the gap. The thickness of the tape also depends on the material of which it is made, but it is generally less than one fifth of the thickness of the pressure sheath and preferably about 1 mm or even less.

Since the tape plays no part in the behavior of the flexible pipe, it may very well degrade on contact with the extruded plastic sheath, from the moment that it nevertheless acts as a heat shield until the internal surface of the plastic sheath has solidified. It therefore has to have a lifetime of approximately one minute.

To be able to install this tape in great length and to avoid any risk of fracture during its installation (which would require restarting the extrusion) or any risk of uncontrolled elongation of the tape, it is preferable for the tape to have a tensile strength of greater than 20 daN (the tensile force imposed by the taping unit). This strength may be provided by the basic constituent material of the tape or by reinforcements, especially by metal reinforcements or textile reinforcements (carbon or Kevlar®-type fibers or rovings) for example in the form of longitudinal reinforcements or meshes.

The width of the tapes is preferably close to the outside diameter of the carcass so as to ensure that it is covered with 3 to 5 tapes.

The constituent material of the covering tapes is chosen to have a relatively low flexural strength (elastic modulus) so as to deform at the gaps, in order to allow the desired creep when the sheath contracts.

The constituent material of the tapes may be of the reinforced or unreinforced heat-shrinkable type, which may improve the formation of the indentations.

The tape may have longitudinal notches (which reduce the tensile strength of the tape), the indentation of the pressure sheath into the carcass taking place through these notches.

The tapes must be made of a material compatible with the pressure sheath, that is to say with polyolefins, polyamides (preferably of the RILSAN® is nylon-11 type), modified or unmodified fluoropolymers (homopolymers or copolymers) (polyvinylidene fluoride PVDF or polyfluoroalcoxy) or hydrocarbon, fluorinated or fluorosilicon elastomers (thermoplastic elastomer or thermoplastic urethane).

The tape must have a flexural strength less than the force of contraction of the pressure sheath as it cools down. The flexural strength of the tape depends on the hot modulus and the thickness of the tape. The force generated by the contraction of the pressure sheath depends on the thickness of the pressure sheath, the hot elastic modulus of this sheath and the size of the gap. Those skilled in the art will known how to determine the behavior of the pressure sheath as it cools down, for example using ABAQUS software, and consequently the maximum tape thickness for allowing indentation of the pressure sheath into the carcass.

In the case in which the tape is eliminated on contact with the extrudate (pressure sheath), an example of a suitable material for the tape is a polyester polyurethane (TPU) known by the name ESTANE® 58271, the viscosity of which decreases rapidly at high temperature (the layer may be eliminated in 30 days at 120°). A small thickness in contact with the extrudate (at an extrusion temperature above 230° C. in the case of a PVDF), the tape will have a lifetime of a few minutes, sufficient to allow the internal surface of the pressure sheath to solidify (solidification temperature close to 160–170° C. in the case of a PVDF).

BRIEF DESCRIPTION OF THE DRAWINGS

Other advantages and features of the present invention will become more clearly apparent on reading the following description, together with the appended drawings, in which.

DESCRIPTION OF PREFERRED EMBODIMENTS

Figure 1:
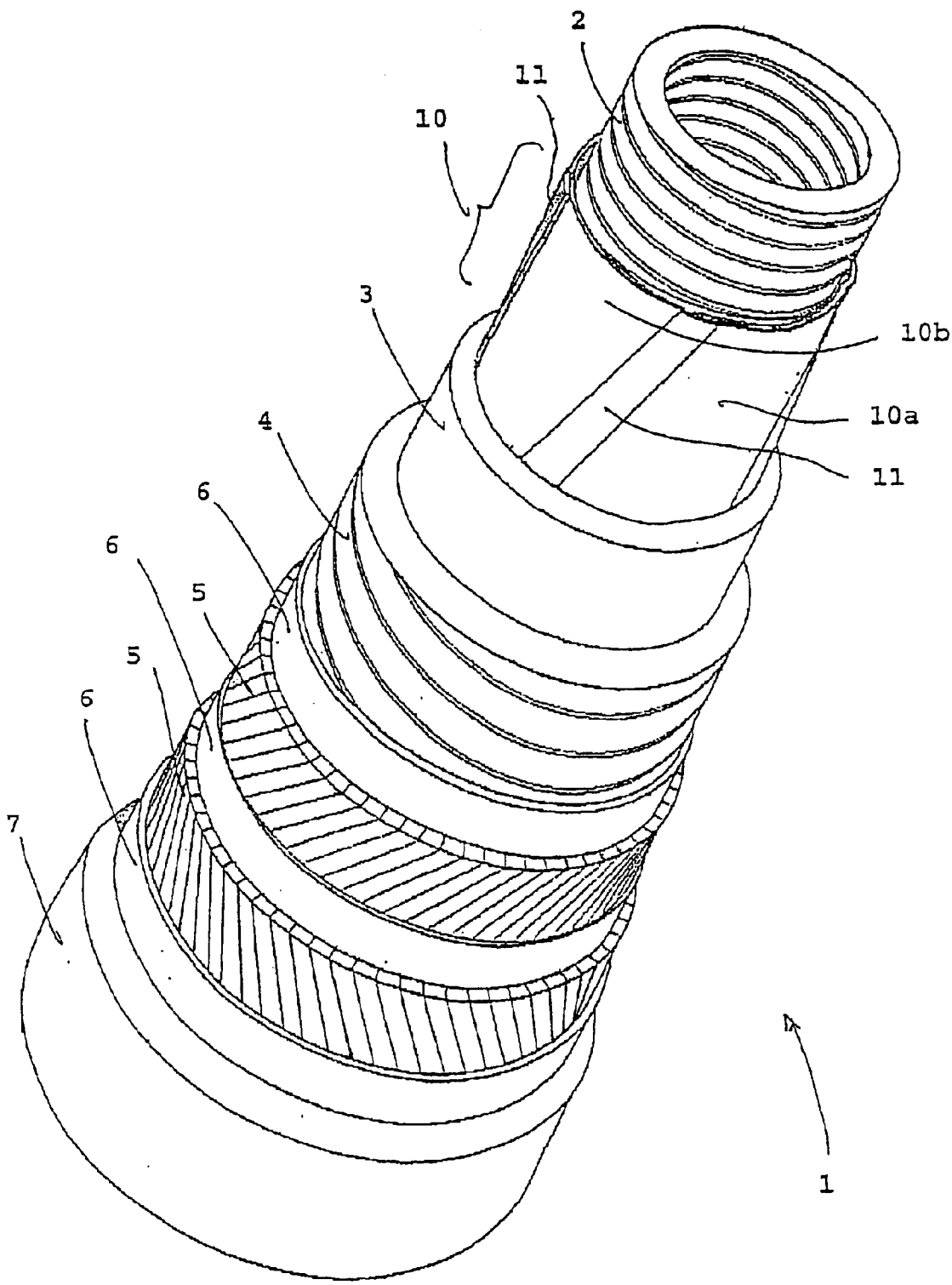
FIG. 1 is a partial perspective view of a rough-bore flexible pipe that includes the covering tapes according to the invention.

A rough-bore flexible pipe 1 comprises, from the inside outward:

a flexible metal tube or carcass 2, formed by a short-pitch helical winding (that is to say one with a winding angle close to 90°) of a metal strip or wire of predetermined cross section;

an internal sealing or pressure sheath 3 made of a polymer, placed around the carcass 2;

a pressure vault 4 resistant mainly to the pressure developed by the fluid in the sealing sheath and formed by the short-pitch helical winding (that is to say one with a winding angle close to 90°) around the internal sheath of one or more interlocked profiled metal wires (which may or may not be self-interlockable); the profiled wires have a Z-shaped or T-shaped cross section or one derived therefrom (teta or zeta), or a U-shaped or I-shaped cross section;

one or more armour plies 5 wound with a long pitch, for example two crossed tensile armour plies whose lay angle, measured along the longitudinal axis of the pipe, is less than 60°;

optionally, one or more intermediate bands 6; and an external sealing sheath 7 made of a polymer.

Figure 2:
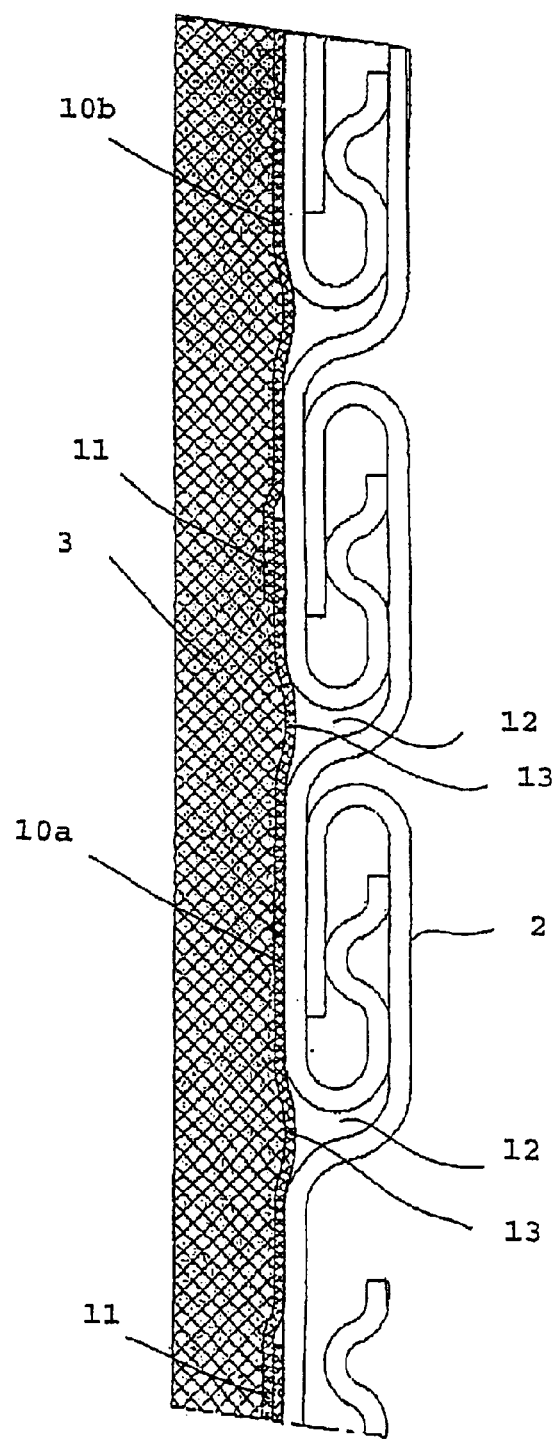
FIG. 2 is a partial longitudinal sectional view of part of the flexible pipe of FIG. 1, showing the covering tapes and the sheath that covers them.

According to the invention, a covering layer 10, formed by covering tapes 10*a*, 10*b*, etc., wound with a long pitch and with a slight marginal overlap 11, was placed between the carcass 2 and pressure sheath 3. As shown in FIG. 2, at a gap 12 between two adjacent turns of the carcass 2 (formed here by an S-shaped self-interlocked strip), after the sheath 3 has been extruded, the tape 10*a* or 10*b* is forced into the gap, forming a helical groove filled by the extruded sheath 3 and thus forming a helical indentation 13.

The tapes forming the covering layer are wound with a long pitch, with a winding angle of less than 35°. According to an extreme case (not shown), the covering layer may be formed by one or more tapes placed longitudinally along the axis of the pipe (the "winding" angle then being 0°).

Figure 4:
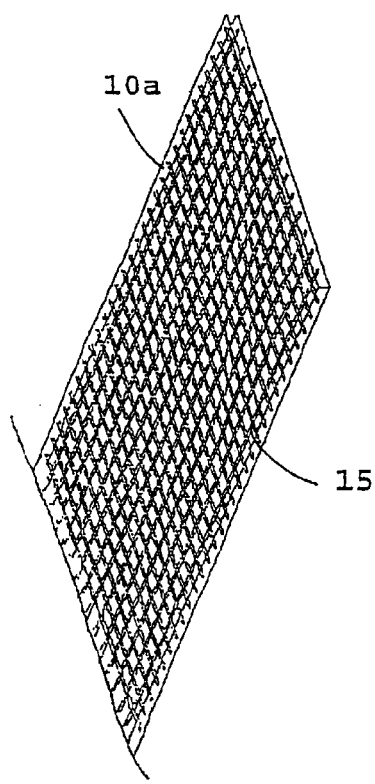
FIGS. 3 to 5 are schematic representations of tapes suitable for the invention.
Figure 5:
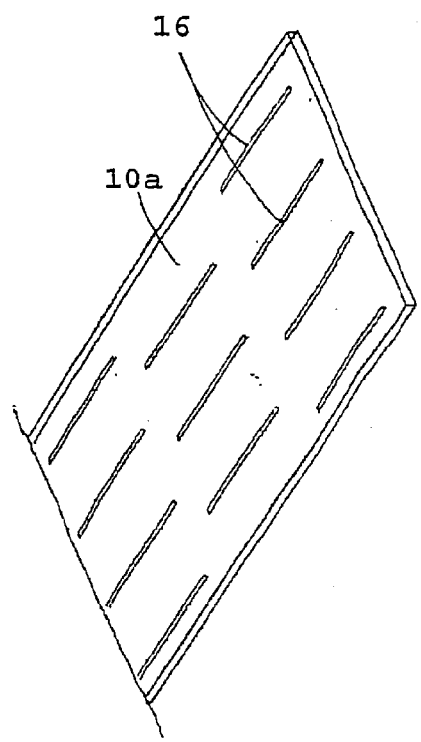
Figure 3:
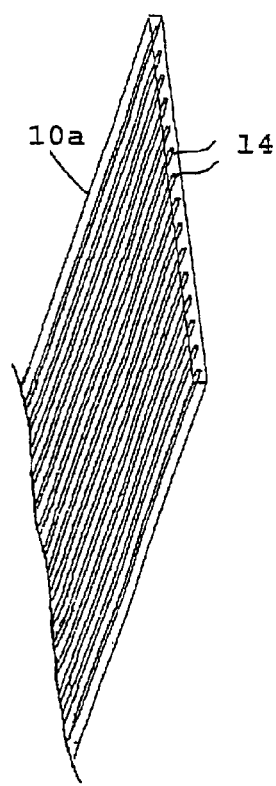

FIGS. 3 to 5 show various examples of covering tapes that can be used in the invention. The tape 10*a* in FIG. 3 has longitudinal reinforcements 14, for example made of Kevlar® or made of carbon, these being placed within a plastic matrix. In FIG. 4, the reinforcements incorporated into the material of the tape 10*a* are in the form of a mesh 15, for example made of metal. In FIG. 5, the tape 10*a* includes longitudinal incisions or notches 16 that allow passage of the constituent material of the sheath during extrusion of the latter and facilitate the formation of larger indentations.

What is claimed is:

1. A flexible pipe comprising, from the inside outward, a carcass formed by a short-pitch helical metal winding wound so as to leave gaps between neighboring windings, a covering layer serving as a heat shield, and comprised of helically wound plastic tapes wound with a winding angle of less than 35°, an internal sealed pressure sheath comprised of a plastic extruded over the covering layer, at least one armor ply and at least one external sealing sheath.

2. The pipe as claimed in claim 1, wherein the winding angle of the tapes is between 10° and 35°.

3. The pipe as claimed in claim 2, wherein the tapes are wound with an overlap.

4. The pipe as claimed in claim 3, wherein the tapes have a thickness of less than or equal to 1 mm.

5. The pipe as claimed in claim 4, wherein the carcass has an outside diameter, and the tapes have a width of about the outside diameter of the carcass.

6. The pipe as claimed in claim 5, wherein the covering layer is formed from 3 to 5 tapes.

7. The pipe as claimed in claim 4, wherein the tapes are comprised of a reinforced plastic.

8. The pipe as claimed in claim 7, wherein the tapes have a tensile strength greater than 20 daN.

9. The pipe as claimed in claim 7, wherein the tapes have longitudinal notches.

10. The pipe as claimed in claim 1, wherein the tapes are wound with an overlap.

11. The pipe as claimed in claim 1, wherein the tapes have a thickness of less than or equal to 1 mm.

12. The pipe as claimed in claim 1, wherein the carcass has an outside diameter, and the tapes have a width of about the outside diameter of the carcass.

13. The pipe as claimed in claim 1, wherein the covering layer is formed from 3 to 5 tapes.

14. The pipe as claimed in claim 1, wherein the tapes are comprised of a reinforced plastic.

15. The pipe as claimed in claim 1, wherein the tapes have a tensile strength greater than 20 daN.

16. The pipe as claimed in claim 1, wherein the tapes have longitudinal notches.

* * * * *